United States Patent
Mei et al.

(10) Patent No.: US 9,577,494 B2
(45) Date of Patent: Feb. 21, 2017

(54) ELASTIC CONE FOR SEALING AND METHOD

(75) Inventors: Luciano Mei, Sesto Fiorentino (IT); Massimo Pinzauti, Florence (IT)

(73) Assignee: Nuovo Pignone SPA, Florence (IT)

( * ) Notice: Subject to any disclaimer, the term of this patent is extended or adjusted under 35 U.S.C. 154(b) by 607 days.

(21) Appl. No.: 14/006,740

(22) PCT Filed: Mar. 23, 2011

(86) PCT No.: PCT/EP2011/054498
§ 371 (c)(1),
(2), (4) Date: Dec. 2, 2013

(87) PCT Pub. No.: WO2012/126525
PCT Pub. Date: Sep. 27, 2012

(65) Prior Publication Data
US 2014/0079576 A1   Mar. 20, 2014

(51) Int. Cl.
*H02K 5/12* (2006.01)
*H02K 5/18* (2006.01)
(Continued)

(52) U.S. Cl.
CPC ............ *H02K 9/197* (2013.01); *F04D 13/06* (2013.01); *H02K 5/128* (2013.01); *H02K 9/00* (2013.01);
(Continued)

(58) Field of Classification Search
CPC .. H02K 5/12; H02K 5/18; H02K 9/00; H02K 9/10; H02K 9/19; H02K 9/22;
(Continued)

(56) References Cited

U.S. PATENT DOCUMENTS 3,938,913 A * 2/1976 Isenberg .................. F04D 3/00
417/356
5,252,875 A   10/1993 Veronesi et al.
(Continued)

FOREIGN PATENT DOCUMENTS

DE   1032379   6/1958
EP   0708284 B1   2/2001
(Continued)

OTHER PUBLICATIONS

PCT Search Report and Written Opinion from corresponding PCT Application No. PCT/EP2011/054498, Dated Mar. 19, 2012.
(Continued)

*Primary Examiner* — Tran Nguyen
(74) *Attorney, Agent, or Firm* — GE Global Patent Operation (57) ABSTRACT

A motor includes a casing having a cavity, a stator configured to be attached to an inside of the cavity, an elastic cone configured to be attached to a first end of the casing, a rigid cone configured to be attached to a second end of the casing that is opposite to the first end, a non-metallic part configured to be attached to the elastic cone and the rigid cone, and a rotor provided inside the cavity and configured to rotate inside the stator. The casing, the elastic cone, the rigid cone, and the non-metallic part form a hermetic enclosure in which the entire stator is enclosed and the hermetic enclosure is configured to hold a cooling fluid that cools the stator and also to prevent the cooling fluid to reach the rotor.

20 Claims, 8 Drawing Sheets

(51) Int. Cl.
*H02K 9/197* (2006.01)
*H02K 5/128* (2006.01)
*F04D 13/06* (2006.01)
*H02K 9/00* (2006.01)
*H02K 15/14* (2006.01)

(52) U.S. Cl.
CPC ........ *H02K 15/14* (2013.01); *Y10T 29/49009* (2015.01)

(58) Field of Classification Search
CPC ......... H02K 15/14; F04D 13/06; F04D 1/063; F04D 29/5806
See application file for complete search history.

(56) References Cited

U.S. PATENT DOCUMENTS

| | | | |
|---|---|---|---|
| 6,742,999 | B1 | 6/2004 | Nuesser et al. |
| 7,508,101 | B2 | 3/2009 | Fogarty |
| 7,579,724 | B2* | 8/2009 | Kaminski ................ H02K 1/16 310/54 |
| 8,629,592 | B2 | 1/2014 | Johnson et al. |
| 2007/0096588 | A1 | 5/2007 | Kirchner |
| 2010/0327537 | A1* | 12/2010 | Johnson ................ H02K 5/128 277/405 |

FOREIGN PATENT DOCUMENTS

| | | |
|---|---|---|
| EP | 1826887 | 8/2007 |
| FR | 955857 | 1/1950 |
| FR | 1260685 | 5/1961 |
| FR | 2720563 | 5/1994 |
| GB | 126099 | 4/1919 |
| GB | 216939 | 6/1924 |
| GB | 308244 | 7/1929 |
| GB | 2289801 | 11/1995 |
| JP | 54150814 U | 10/1979 |
| JP | 6032539 A | 2/1985 |
| JP | 2011010545 A | 1/2011 |
| RU | 2266141 C2 | 12/2005 |
| WO | 2008022108 | 2/2008 |

OTHER PUBLICATIONS

Italian Search Report from corresponding Italian Application No. CO20100009, Dated Nov. 15, 2010.
Unofficial English translation of Japanese Office Action issued in connection with corresponding JP Application No. 2014-500264 on Dec. 2, 2014.
Russian Office Action issued in connection with corresponding RU Application No. 2013141248/07 on Feb. 6, 2015.
Russian Notice of Acceptance issued in connection with corresponding RU Application No. 2013141248 on Jun. 11, 2015.

* cited by examiner

ELASTIC CONE FOR SEALING AND METHOD

CROSS-REFERENCE TO RELATED APPLICATIONS

This is a national stage application under 35 U.S.C. §371(c) prior-filed, co-pending PCT application serial number PCT/EP2011/054498, filed on Mar. 23, 2011 the disclosure of which are incorporated herein.

TECHNICAL FIELD

Embodiments of the subject matter disclosed herein generally relate to methods and systems and, more particularly, to mechanisms and techniques for sealing an enclosure while maintaining an integrity of the enclosure when the enclosure is exposed to thermal stress.

BACKGROUND

During the past years, with the increase in price of fossil fuels, the interest in many aspects related to the processing of the fossil fuels has increased. In addition, there is an increased interest in producing more efficient and reliable motors, machines, turbines, compressors, etc. to facilitate a better production and distribution of oil and gas based products.

One such field generally relates to fluid transport systems and, more particularly, to an electrical machine to move fluids through a pipeline. For example, fluids are transported from on-shore or offshore locations to processing plants for subsequent use. There are many type of fluids that need to be transported between different locations. One such fluid may be a highly corrosive gas. In other applications, fluid transport is used in hydrocarbon processing industries and chemical industries, and to facilitate distribution to end-users. At least some fluid transport stations use machinery, such as compressors, fans and/or pumps that are driven by gas turbines. Some of these turbines drive the associated fluid transport apparatus via a gearbox that either increases or decreases a gas turbine output drive shaft speed to a predetermined apparatus drive shaft speed. Electrical machines (i.e., electrically-powered drive motors, or electric drives) may be advantageous over mechanical drives (i.e., gas turbines) in operational flexibility (variable speed for example), maintainability, lower capital cost and lower operational cost, better efficiency and environmental compatibility.

Also, electric drives are generally simpler in construction than mechanical drives, generally require a smaller foot print, may be easier to integrate with the fluid transport apparatus, may eliminate the need for a gearbox, and/or may be more reliable than mechanical drives. However, systems using electric drives generate heat via the drive components, within the stators for example, and may require supplemental systems to facilitate heat removal. For example, some electric drives use the fluid being transported as the primary heat transfer medium and channel the fluid through and around the stator. However, in some cases, the fluid being transported may have aggressive constituents or impurities which may adversely affect the efficiency of the components of the stator. For example an acid fluid being transported negatively affects the copper components of the stator.

For these reasons, a traditional electric machine may place the stator of the machine inside an enclosure that isolates the stator from the rotor as disclosed in Kaminski et al. (U.S. Pat. No. 7,508,101, the entire content of which is incorporated herein by reference) and Kaminski et al. (U.S. Pat. No. 7,579,724, the entire content of which is incorporated herein by reference). Oil may be provided inside the enclosure to maintain the stator in an oil environment that does not damage the copper or other components and also to remove the heat from the stator while the transported fluid contacts only the rotor. The enclosure has part of the walls made by metal and one wall, between the stator and the rotor, made of a non-metallic material, as known in the art.

A problem with the traditional electrical machines is the thermal stress/strain applied to the non-metallic wall during the operation of the machine. If the thermal stress/strain between the metal walls and the non-metallic wall is significant, the non-metallic part may break, which results in the oil being released from the enclosure and damaging the machine. The thermal stress/strain is generated when the machine is operational and its temperature increases from the environment temperature (which may be around 20° C.) to the operational temperature (which may be in the 80 to 150° C. range). Another factor that contributes to the thermal stress is the difference in the coefficients of thermal expansion of the metal wall and the non-metallic wall as it is known that a metal has, in general, a coefficient of thermal expansion three times larger than a non-metallic part. Thus, while operating, the metal walls expand more than the non-metallic wall, which may result in a failure of the non-metallic wall due to the stress/strain applied by the metal walls.

Accordingly, it would be desirable to provide systems and methods that prevent the strain of the non-metallic wall of the enclosure.

SUMMARY

According to one exemplary embodiment, there is a motor including a casing having a cavity; a stator configured to be attached to an inside of the cavity; an elastic cone configured to be attached to a first end of the casing; a rigid cone configured to be attached to a second end of the casing that is opposite to the first end; a non-metallic part configured to be attached to the elastic cone and the rigid cone; and a rotor provided inside the cavity and configured to rotate inside the stator. The casing, the elastic cone, the rigid cone, and the non-metallic part form a hermetic enclosure in which the entire stator is enclosed and the hermetic enclosure is configured to hold a cooling fluid that cools the stator and also to prevent the cooling fluid to reach the rotor.

According to another exemplary embodiment, there is an elastic cone to be attached to a casing of a motor. The elastic cone includes a curved body extending from a wide end to a narrow end; one or more holes in the wide end configured to receive a bolt for attaching the elastic cone to the casing of the motor; and a receiving portion provided in the narrow end and configured to receive an end of a non-metallic wall that isolates a stator of the motor from a rotor of the motor. The receiving portion has a trench configured to receive a metallic seal that seals an interface between the elastic cone and the non-metallic wall.

According to still another exemplary embodiment, there is a method for providing a hermetically sealed enclosure inside a motor. The method includes attaching a stator to a casing of the motor; attaching a rigid cone to a first end of the casing; attaching an elastic cone to a second end of the casing, the second end being opposite to the first end, such that the stator is surrounded by the casing, the rigid cone and the elastic cone; connecting a non-metallic wall to the rigid cone and the elastic cone to form the hermetically sealed enclosure such that the stator is inside the enclosure; and providing a rotor inside the stator and facing the stator through the non-metallic wall.

According to still another exemplary embodiment, there is a system for transporting a fluid. The system includes a compressor configured to increase a pressure of the fluid, and a motor connected to the compressor and configured to drive the compressor. The motor includes a casing having a cavity, a stator configured to be attached to an inside of the cavity, an elastic cone configured to be attached to a first end of the casing, a rigid cone configured to be attached to a second end of the casing that is opposite to the first end, a non-metallic part configured to be attached to the elastic cone and the rigid cone, and a rotor provided inside the cavity and configured to rotate inside the stator. The casing, the elastic cone, the rigid cone, and the non-metallic part form a hermetic enclosure in which the entire stator is enclosed and the hermetic enclosure is configured to hold a cooling fluid that cools the stator and also to prevent the cooling fluid to reach the rotor.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an electrical motor that has a stator and a rotor. However, the embodiments to be discussed next are not limited to these systems, but may be applied to other systems that use an enclosure having walls made of different materials.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a stator of an electric motor is provided inside an enclosure that has a metal wall and a non-metallic wall. The non-metallic wall is attached with one end to an elastic wall that does not tension the non-metallic wall as much as a rigid wall, thus, applying less stress/strain on the non-metallic wall when the metal wall expands due to an increase of temperature.

Figure 1:
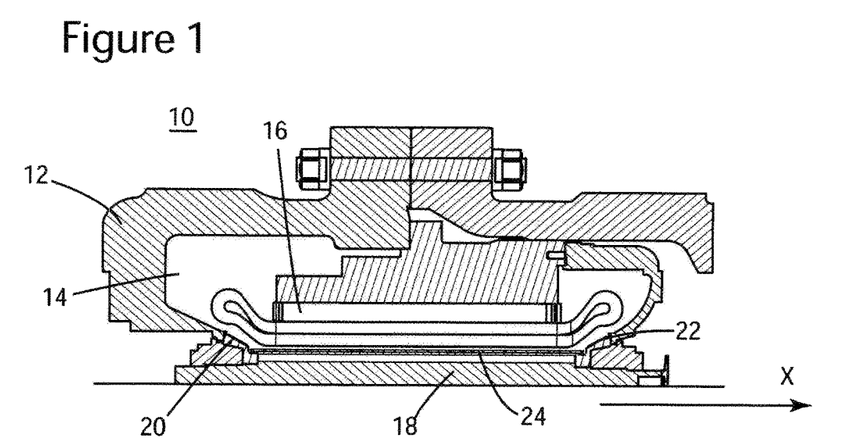
FIG. 1 is a schematic diagram of a motor having two rigid cones.

As shown in FIG. 1, an electric motor 10 includes a casing 12. Casing 12 has a cavity 14 in which a stator 16 is provided. The stator 16 is fixed relative to the casing 12, i.e., stator 16 does not rotate relative to casing 12. A rotor 18 is provided inside casing 12 but the rotor 18 is configured to rotate about a longitudinal axis X. Two rigid cones 20 and 22 are attached to the casing 12 to face the ends of the stator 16. Between the two cones 20 and 22, a non-metallic wall 24 is provided. The non-metallic wall 24 is attached to the cones 20 and 22 and is configured to not touch the stator 16.

Figure 2:
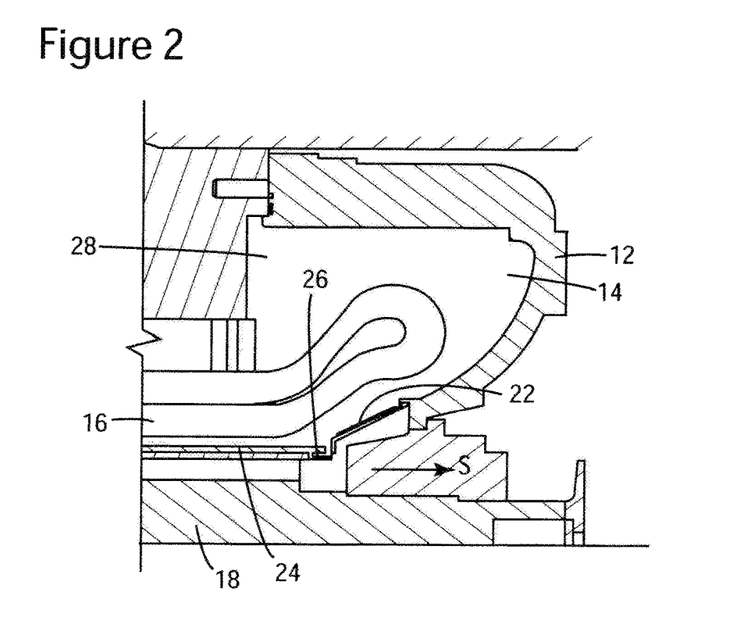
FIG. 2 is a schematic diagram of a rigid cone used in a motor for forming an enclosure.

FIG. 2 shows in more details the connection between the non-metallic wall 24 and the cone 22. A brazing layer 26 is disposed between the cone 22 and the non-metallic wall 24 and the enclosure 28 is defined by the casing 12 and the non-metallic wall 24. The enclosure 28 is hermetically sealed with the brazing layer 26. The same brazing layer is applied between the other end of the non-metallic wall 24 and the cone 20.

However, as the casing 12 and cones 20 and 22 are made of metal while the non-metallic wall 24 is formed of a material that is not a metal, when the temperature of the electric machine 10 increases, for example, from room temperature (about 20° C.) to the operational temperature of the machine (about 150 to 250° C.), the expansion of the casing and cones is larger than the expansion of the non-metallic wall, which thermally stresses/strains the non-metallic wall. In one application, a direction of the stress/strain applied to the non-metallic wall is illustrated by S in FIG. 2. This stress/strain may, in some situations, break the non-metallic wall 24. If this happens, a possible damaging fluid that is circulating between the stator 16 and rotor 18 may enter cavity 14 and damage the stator 16. Also, if a cooling fluid is used inside cavity 14 for cooling the stator 16, the cooling fluid may leak to the rotor 18, creating undesired problems.

Figure 3:
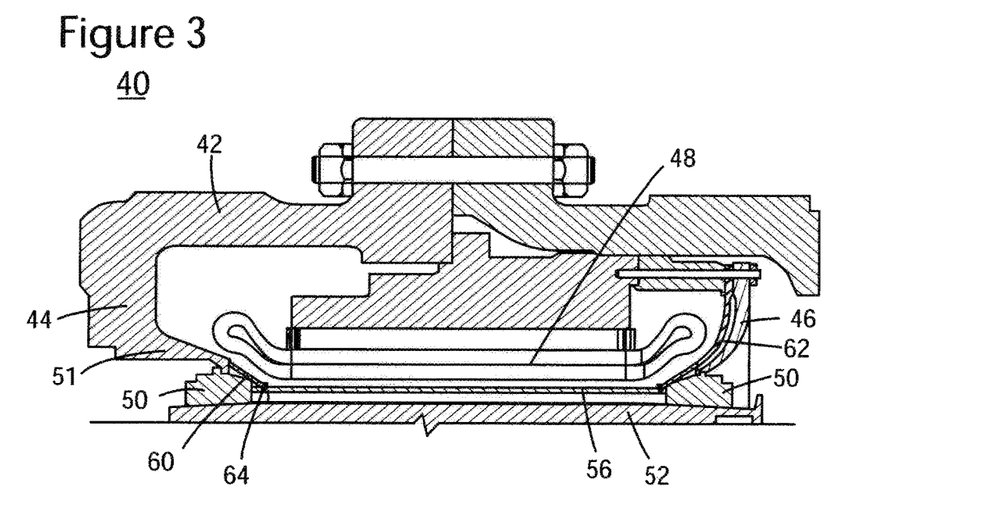
FIG. 3 is a schematic diagram of a motor having one rigid cone and one elastic cone according to an exemplary embodiment.
Figure 11:
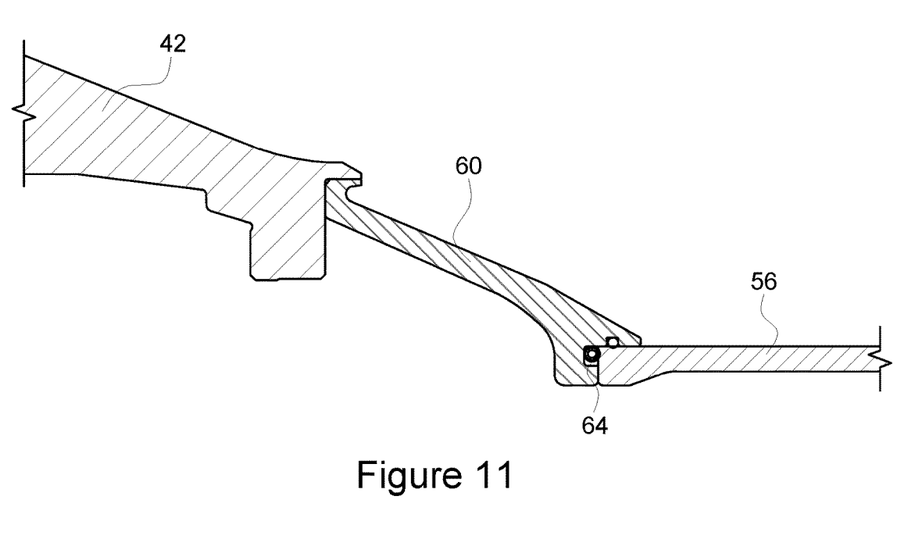
FIG. 11 is an expanded view of FIG. 3, showing a schematic diagram of a seal interposed between a rigid cone and a non-metallic part according to an exemplary embodiment.

According to an exemplary embodiment shown in FIG. 3, an electric motor 40 is shown having a casing 42 and two sides 44 and 46 that face a stator 48. The stator 48 is fixedly attached to the casing 42. Side 46 (also called bearing casing support) of the casing 42 is connected to a bearing casing 50, that includes a bearing system for rotationally supporting rotor 52. A non-metallic wall 56 is connected between a rigid cone 60 and an elastic cone 62. The rigid cone 60 is similar to the rigid cone 20 shown in FIG. 1. The rigid cone 60 is attached to one side 44 of the casing 42. In one application, the rigid cone 60 is compressed against the non-metallic wall 56 with a seal 64 interposed between the rigid cone 60 and the non-metallic wall 56. In one embodiment, as shown in FIG. 11, a seal 64 is interposed between a rigid cone 60 and a non-metallic part 56, where the rigid cone 60 is compressed against the non-metallic part 56.

Figure 4:
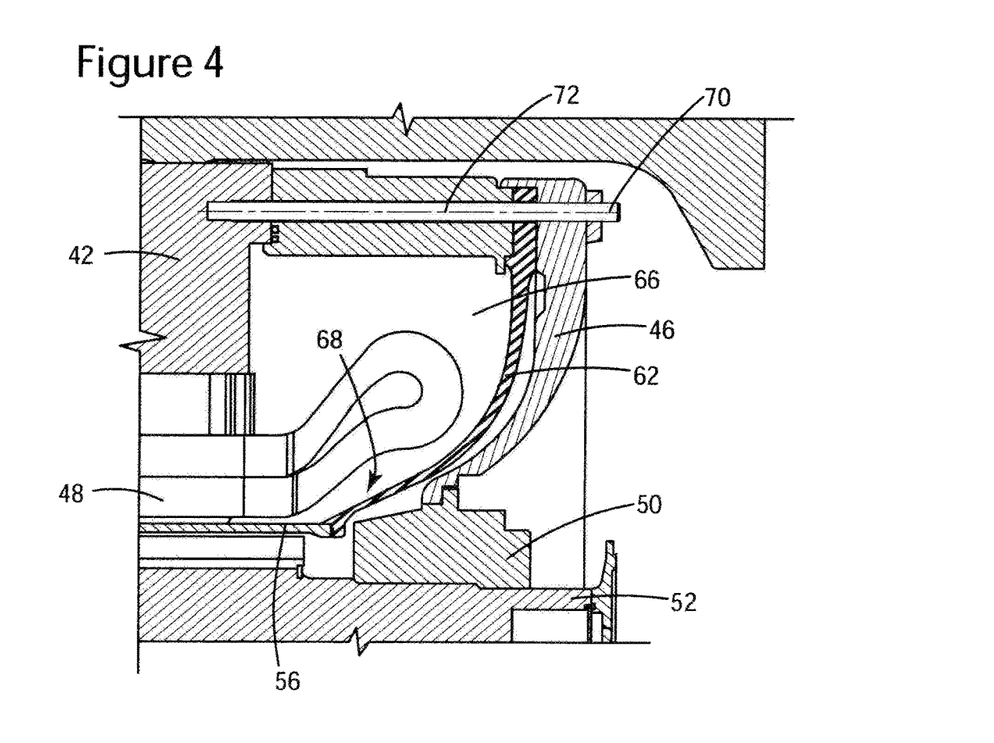
FIG. 4 is a schematic diagram of a elastic cone according to an exemplary embodiment.

However, the other end of the non-metallic wall 56 is not attached to a rigid cone as shown in FIG. 1, but on the contrary, is attached to an elastic cone 62 that reduces a stress/strain applied to the non-metallic wall 56 when a temperature of the casing is increased. FIG. 4 shows the elastic cone 62 being provided between the two sides 44 and 46 of the casing 42. Further, a cavity 66 in which the stator is hermetically sealed is formed by casing 42, side 44, rigid cone 60, non-metallic wall 56 and the elastic cone 62. In one application, the rigid cone 46 does not border cavity 66. A cooling fluid for cooling the stator is provided inside cavity 66. In one application, the cooling fluid may be oil.

The non-metallic wall 56 is connected to the elastic cone 62 such that the cooling fluid from cavity 66 does not escape to reach rotor 52. For this reason, a sealing 68 may be provided at an interface between the elastic cone 62 and the non-metallic wall 56. In one application, the sealing 68 may be a metallic seal. In one application, sealing 68 is identical to sealing 64.

According to an exemplary embodiment shown in FIG. 4, the elastic cone 62 may be attached to casing 42 by a plurality of bolts 70. Corresponding holes 72 may be formed in the casing 42 and the elastic cone 62 to allow the bolts 70 to enter the casing 42. In one exemplary embodiment, the same bolt 70 is used to also attach the side 46 to the casing 42 as shown, for example, in FIG. 4.

Figure 5:
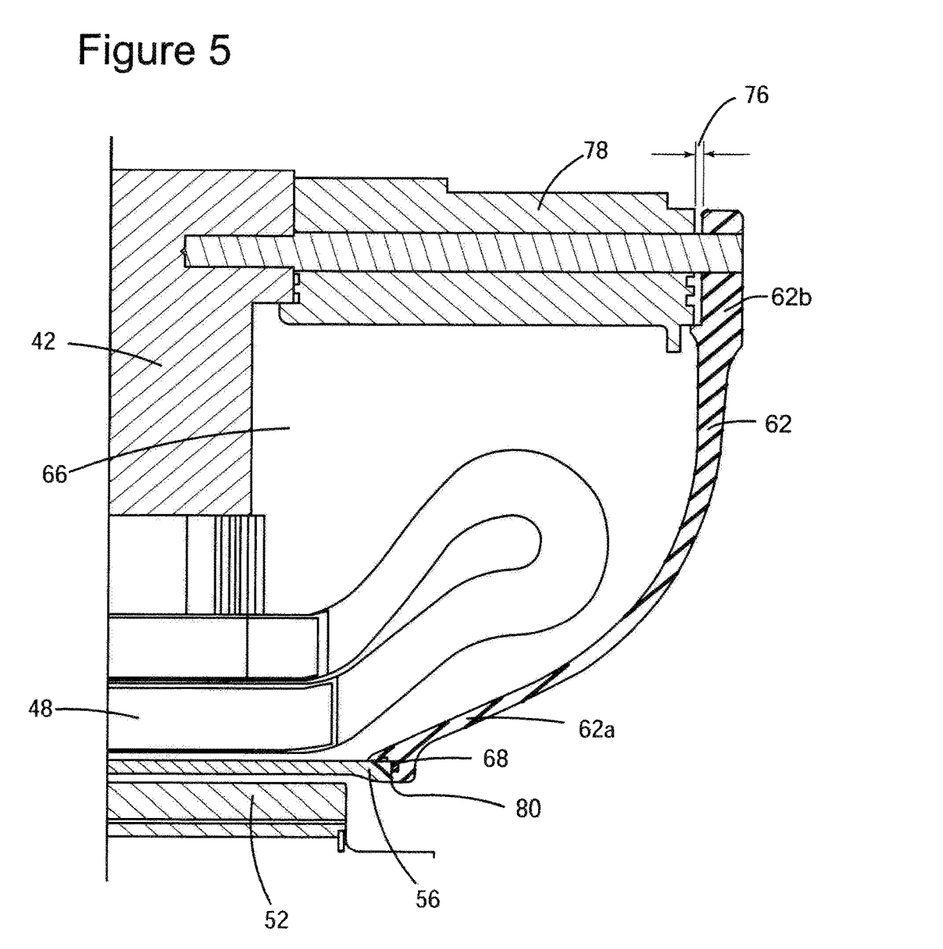
FIG. 5 is a schematic diagram of an elastic cone and a non-metallic wall according to an exemplary embodiment.
Figure 6:
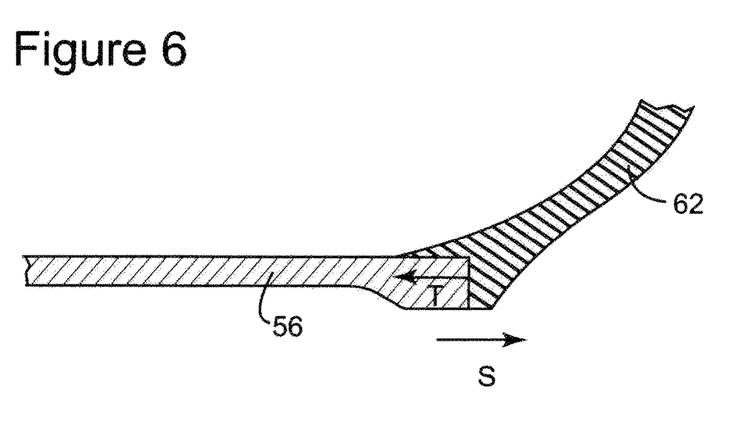
FIG. 6 is a schematic diagram of a connection between an elastic cone and a non-metallic wall according to an exemplary embodiment.

One advantage of one or more of the above exemplary embodiments is discussed with reference to FIGS. 5 and 6. FIG. 5 shows in more details that the elastic cone 62 is assembled to an intermediary portion 78 of the casing 42 with a gap 76. In other words, when end 62a of the elastic cone 62 contacts non-metallic wall 56, end 62b makes a gap 76 with the intermediary portion 78. Thus, a tension T (see FIG. 6) is applied to the non-metallic wall 56 by the elastic cone 62 when the elastic cone 62 is attached to the casing 42 at end 62b. This pre-load of the elastic cone 62 is proportional with the gap 76. It is noted that no tension is applied in the traditional motors to the non-metallic part at room temperature when the motor is assembled. In one application, the gap 76 is between 1 and 5 mm. In another application, the gap is calculated such that it is larger than the thermal expansion of the casing. Still in another application, the gap is calculated to be at least five times larger than the thermal expansion of the casing.

Further, consider that the motor is in use and the temperature of the casing 42, the rigid cone 60, the elastic cone 62 and the non-metallic wall 56 has increased from the room temperature to the operational temperature. Due to the larger expansion of the casing 42 than the non-metallic wall 56, it is expected that a thermal stress/strain force S appears in the non-metallic wall 56 as shown in FIG. 6. However, because the elastic cone 62 was pre-loaded, the thermal stress/strain force S eventually reduces and/or cancels out the tension T, thus, minimizing a force that may damage the non-metallic wall 56. Depending on the size of the gap 76 and the materials of the casing 42 and the elastic cone 62, the pre-load force T may be calculated to cancel out force S that appears due to thermal expansion. In one application, the force T reduces the effect of force S but does not cancel out force S.

According to an exemplary embodiment, the elastic cone 62 may be considered as acting as a spring on the non-metallic wall 56, thus biasing the non-metallic wall towards the rigid cone 60 (see FIG. 3). Depending on the elastic properties of the elastic cone 62 and the size of gap 76, the force T applied at pre-loading by the elastic cone 62 may be adjusted as desired. As an example of materials to be used for the elastic cone 62, it is noted that a super alloy, ICONEL alloy (600, 625, 718, etc.), or a steel alloy may be used for the elastic cone. The elasticity of the elastic cone 62 may be given by its particular shape and dimensions and not by the specific composition of the material. In this way, the elastic cone is about 10 times more elastic than the rigid cone. In one application, the elastic cone has high tensile properties and it is shaped to have higher elasticity constant than the rigid cone.

In one application, the casing may expand about 1 mm when reaching an operating temperature between 80 and 150° C. and the elastic cone is configured to reduce in the non-metallic wall a thermal stress associated with the casing expansion. In an exemplary embodiment, the non-metallic wall 56 is brazed to the elastic cone 62 at a contact interface 80. Alternatively, the non-metallic wall 56 may be bolted to the elastic cone 62, or attached by other known means in the art. However, there is a case when the interface 80 is free of any attaching material except the seal 68. In this case, the biased applied by the elastic cone 62 to the non-metallic wall 56 is the only means that keeps together these two elements.

In another exemplary embodiment, the motor 10 may include first and second bearing devices 50 (see FIG. 3) provided at corresponding ends of the rotor 52 and first and second bearing casing support devices (51 and 46) provided at corresponding ends of the stator such that the elastic cone is provided between the second bearing casing and the stator.

Figure 7:
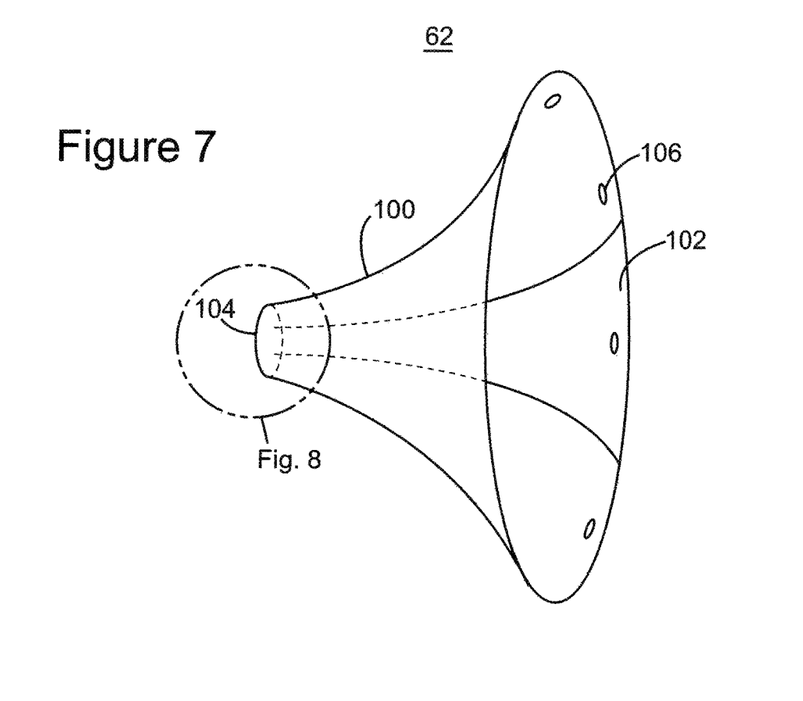
FIG. 7 is a schematic diagram of an elastic cone according to an exemplary embodiment.
Figure 8:
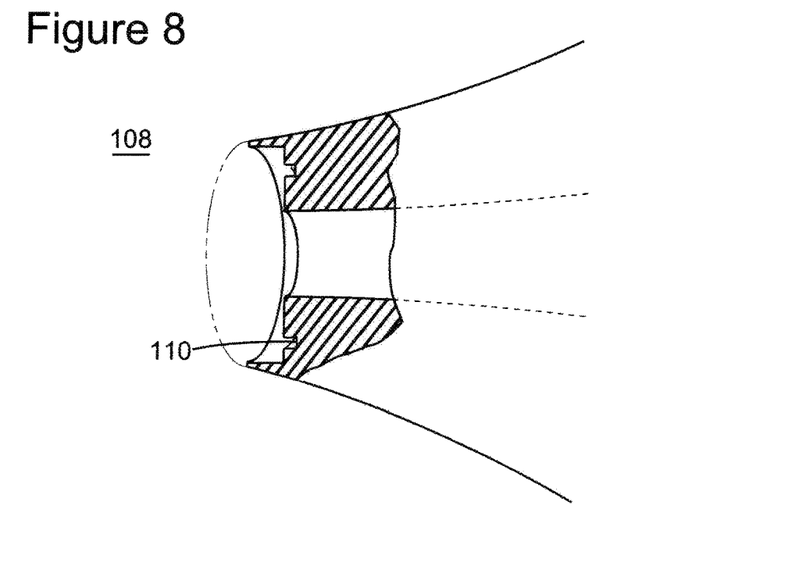
FIG. 8 is a schematic diagram of a detail of the elastic cone of FIG. 7 according to an exemplary embodiment.

According to an exemplary embodiment shown in FIG. 7, the elastic cone includes a curved body 100 extending from a wide end 102 to a narrow end 104, one or more holes 106 in the wide end 102 and configured to receive a bolt for attaching the elastic cone to the casing of the motor, and a receiving portion 108 (see FIG. 8) provided in the narrow end 104 and configured to receive an end of a non-metallic part that isolates a stator of the motor from a rotor of the motor. The receiving portion 108 has a trench 110 configured to receive a metallic seal that seals an interface between the elastic cone and the non-metallic part. The elastic cone has a three dimensional shape that is similar to a curved cone, as shown in FIG. 7.

Figure 9:
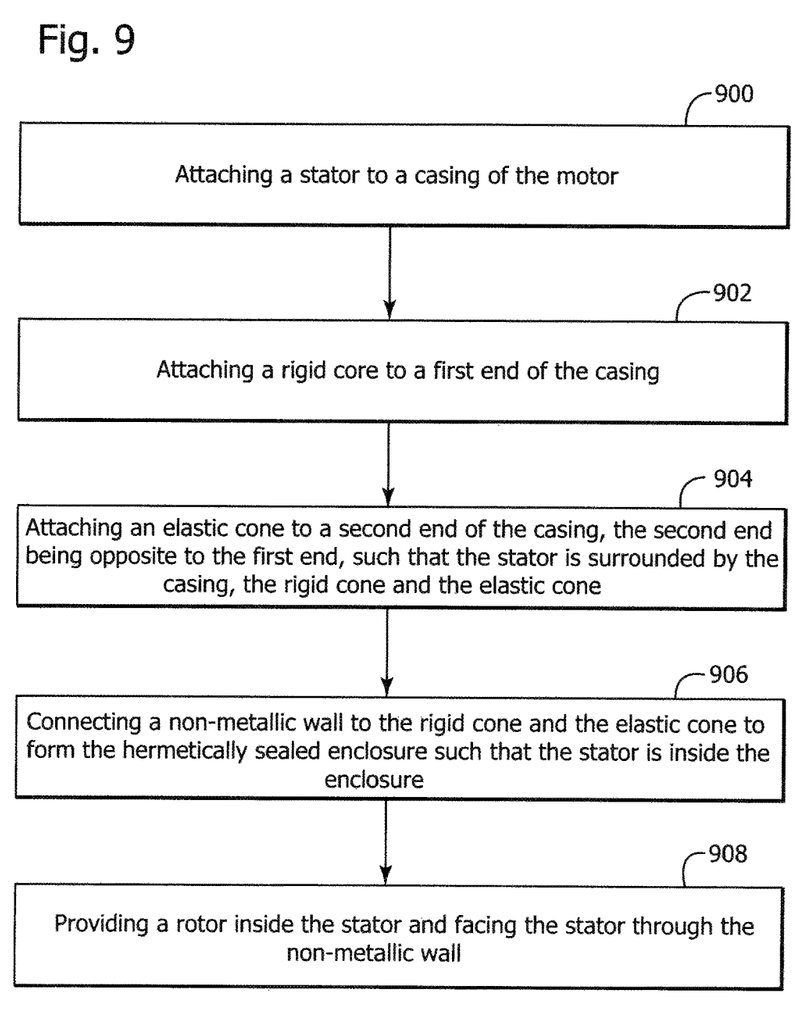
FIG. 9 is a flow chart illustrating a method for assembling a motor with an elastic cone according to an exemplary embodiment.

According to an exemplary embodiment shown in FIG. 9, there is a method for providing a hermetically sealed enclosure inside a motor. The method includes a step 900 of attaching a stator to a casing of the motor; a step 902 of attaching a rigid cone to a first end of the casing; a step 904 of attaching an elastic cone to a second end of the casing, the second end being opposite to the first end, such that the stator is surrounded by the casing, the rigid cone and the elastic cone; a step 906 of connecting a non-metallic wall to the rigid cone and the elastic cone to form the hermetically sealed enclosure such that the stator is inside the enclosure; and a step 908 of providing a rotor inside the stator and facing the stator through the non-metallic wall.

Figure 10:
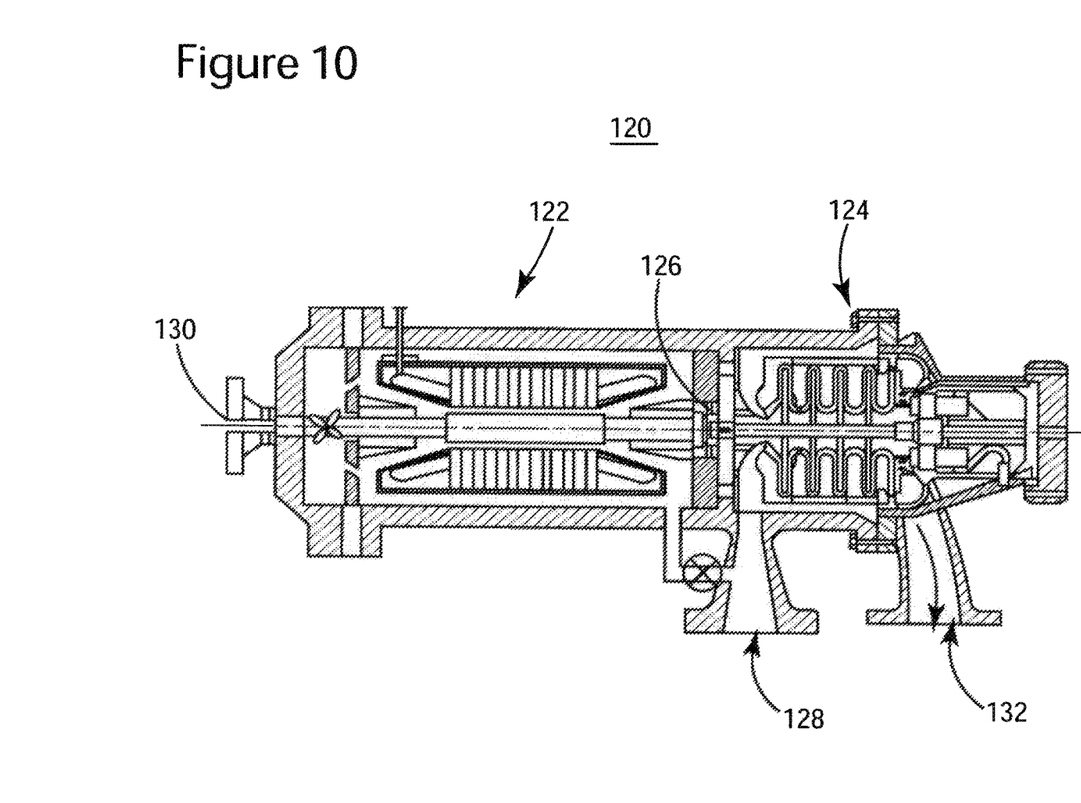
FIG. 10 is a schematic diagram of a system for transporting a fluid according to an exemplary embodiment.

According to an exemplary embodiment illustrated in FIG. 10, there is a system 120 for facilitating a transport of oil and gas products. For example, the system 120 may a motor 122 and a compressor 124. In one application, the compressor 124 is replaced with a pump. Motor 122 may be the motor 40 shows in FIG. 3 or other motors known in the art. A shaft of the motor 122 may be directly coupled via a coupling 126 to a shaft of the compressor 124. Alternatively, coupling 126 may be a gear box. Motor 122 may be connected to the power grid (not shown) and configured to drive compressor 124. Compressor 124 may have an inlet 128 at which the product to be transported is provided. Part of the product may be diverted through the motor 122, for example, at inlet 130. The product may cool the motor 122 as discussed with regard to FIGS. 1 and 4 and then the used product is returned at inlet 128 of the compressor 124. The product having the high pressure is output at outlet 132, for example, into a transport pipeline. As shown in FIG. 10, the motor 122 and 124 may be provided in a same casing. Alternately, the two units may be provided in different casings.

The disclosed exemplary embodiments provide a system and a method for preventing a cracking or failure of a non-metallic wall that is part of an enclosure inside a motor. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A motor, comprising:
a casing having a cavity;
a stator configured to be attached to an inside of the cavity;
an elastic cone configured to be attached to a first end of the casing;
a rigid cone configured to be attached to a second end of the casing that is opposite to the first end;
a non-metallic part configured to be attached to the elastic cone;
a rotor provided inside the cavity and configured to rotate inside the stator; and
a seal interposed between the rigid cone and the non-metallic part, wherein the rigid cone is compressed against the non-metallic part;
wherein the casing, the elastic cone, the rigid cone, and the non-metallic part form a hermetic enclosure in which the entire stator is enclosed and the hermetic enclosure is configured to hold a cooling fluid that cools the stator and also to prevent the cooling fluid to reach the rotor.

2. The motor of claim 1, wherein the elastic cone is made of a metallic material that is shaped to have higher elasticity constant than the rigid cone.

3. The motor of claim 1, wherein the elastic cone is attached to the casing by one or more bolts.

4. The motor of claim 1, wherein the elastic cone is configured to bias the nonmetallic part and press the non-metallic part against the rigid cone.

5. The motor of claim 1, wherein
the seal is metallic and is disposed between and contacting the non-metallic part and the elastic cone and also between non-metallic part and the rigid cone such that the cooling fluid is prevented from leaking at the interface between the non-metallic part and the elastic and rigid cones.

6. The motor of claim 1, wherein the elastic cone is assembled with the casing and the non-metallic part to be under a preload strain at room temperature.

7. The motor of claim 6, wherein the preload strain at room temperature is predetermined such that as the motor reaches an operating temperature between 80 and 150° C., the strain in the elastic cone and rigid cone decreases.

8. The motor of claim 1, wherein the casing expands about 1 mm when reaching an operating temperature between 80 and 150° C.

9. The motor of claim 1, further comprising:
first and second bearing devices provided at corresponding ends of the rotor and configured to support the rotor; and
first and second bearing casing support devices provided at corresponding ends of the casing such that a first end of the first bearing casing support device is attached to the casing and a second end of the first bearing casing support device is attached to the rigid cone and a first end of the second bearing casing support device is attached to the casing and a second end of the second bearing casing support device is attached to the second bearing device, wherein
the elastic cone is provided between the second bearing casing support device and the stator.

10. The motor of claim 1, wherein there is no other connection between the nonmetallic part and the elastic cone except a direct contact due to the preload strain in the elastic cone.

11. The motor of claim 1, wherein the hermetic enclosure is filled with oil and the hermetic enclosure protects the stator from a corrosive gas that circulates between the nonmetallic part and the rotor.

12. An elastic cone to be attached to a casing of a motor, the elastic cone comprising:
a curved body extending from a wide end to a narrow end;
one or more holes in the wide end configured to receive a bolt for attaching the elastic cone to the casing of the motor; and
a receiving portion provided in the narrow end and configured to receive an end of a non-metallic part that isolates a stator of the motor from a rotor of the motor,
wherein the receiving portion has a trench configured to receive a metallic seal that seals an interface between the elastic cone and the non-metallic part.

13. The elastic cone of claim 12, wherein the elastic cone is made of a metallic material that has a high tensile properties and it is shaped to have higher elasticity constant than a rigid cone that is provided at the other end of the non-metallic part.

14. A method for providing a hermetically sealed enclosure inside a motor, the method including:
attaching a stator to a casing of the motor;
attaching a rigid cone to a first end of the casing;

attaching an elastic cone to a second end of the casing, the second end being opposite to the first end, such that the stator is surrounded by the casing, the rigid cone and the elastic cone;

connecting a non-metallic part to the elastic cone and to a seal interposed between the rigid cone and the non-metallic part, wherein the rigid cone is compressed against the non-metallic part to form the hermetically sealed enclosure such that the stator is inside the enclosure; and providing a rotor inside the stator and facing the stator through the non-metallic part.

15. A system for transporting a fluid, the system comprising:

a compressor configured to increase a pressure of the fluid; and a motor connected to the compressor and configured to drive the compressor, wherein the motor comprises:

a casing having a cavity, a stator configured to be attached to an inside of the cavity, an elastic cone configured to be attached to a first end of the casing, a rigid cone configured to be attached to a second end of the casing that is opposite to the first end, a non-metallic part configured to be attached to the elastic cone and a seal which is interposed between the rigid cone and the non-metallic part, wherein the rigid cone is compressed against the non-metallic part, and a rotor provided inside the cavity and configured to rotate inside the stator, wherein the casing, the elastic cone, the rigid cone, and the non-metallic part form a hermetic enclosure in which the entire stator is enclosed and the hermetic enclosure is configured to hold a cooling fluid that cools the stator and also to prevent the cooling fluid to reach the rotor.

16. The motor of claim 1, wherein, the elastic cone comprises a curved body extending from a wide end to a narrow end.

17. The motor of claim 1, wherein, the elastic cone comprises one or more holes in the wide end configured to receive a bolt for attaching the elastic cone to the casing of the motor.

18. The motor of claim 16, wherein the elastic cone further comprises a receiving portion provided in the narrow end configured to receive an end of a non-metallic part that isolates a stator of the motor from a rotor of the motor.

19. The motor of claim 16, wherein the elastic cone further comprises the receiving portion having a trench configured to receive a metallic seal that seals an interface between the elastic cone and the non-metallic part.

20. The motor of claim 1, wherein the elastic cone is made of a metallic material that shaped to have higher elasticity constant than that of the rigid cone.

* * * * *